United States Patent
Lee et al.

(10) Patent No.: US 12,275,878 B2
(45) Date of Patent: Apr. 15, 2025

(54) FOLDABLE BACKPLATE FILM MANUFACTURING METHOD

(71) Applicant: LG CHEM, LTD., Seoul (KR)

(72) Inventors: Hui Je Lee, Daejeon (KR); Hyun Cheol Kim, Daejeon (KR); In Hwan Jeon, Daejeon (KR); Sa Young Jung, Daejeon (KR); Jin Ho Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 134 days.

(21) Appl. No.: 18/254,770

(22) PCT Filed: Feb. 21, 2022

(86) PCT No.: PCT/KR2022/002495
§ 371 (c)(1),
(2) Date: May 26, 2023

(87) PCT Pub. No.: WO2022/182076
PCT Pub. Date: Sep. 1, 2022

(65) Prior Publication Data
US 2024/0018397 A1  Jan. 18, 2024

(30) Foreign Application Priority Data
Feb. 24, 2021 (KR) .................. 10-2021-0025029

(51) Int. Cl.
*C09J 7/40* (2018.01)
*B32B 3/30* (2006.01)
(Continued)

(52) U.S. Cl.
CPC .............. *C09J 7/403* (2018.01); *B32B 3/30* (2013.01); *B32B 7/06* (2013.01); *B32B 7/12* (2013.01);
(Continued)

(58) Field of Classification Search
None
See application file for complete search history.

(56) References Cited

U.S. PATENT DOCUMENTS 7,022,204 B2 *  4/2006  Kanbara ........... G02F 1/133528
                                                          156/247
9,953,856 B2 *  4/2018  Yamamoto ................ C09J 7/20
(Continued)

FOREIGN PATENT DOCUMENTS

EP        3406552 A1 * 11/2018 ............. A45C 11/00
JP    2005309067 A * 11/2005
(Continued)

OTHER PUBLICATIONS

Machine translation JP2005309067A (Year: 2005).*
(Continued)

*Primary Examiner* — Jacob T Minskey
*Assistant Examiner* — Ayne K. Swier
(74) *Attorney, Agent, or Firm* — Ricky Lam

(57) ABSTRACT

The present application relates to a method for manufacturing a foldable backplate film, and according to one aspect of the present invention, a method for manufacturing a foldable backplate film that the foldable backplate film is manufactured by a method of cutting it in a direction from the release film to the protective film upon half-cutting, and then release-changing the release film, whereby by improving a half-cutting process, the foldable backplate does not fall off upon the release film peeling, is provided.

13 Claims, 4 Drawing Sheets

(51) Int. Cl.
  B32B 7/06    (2019.01)
  B32B 7/12    (2006.01)
  B32B 27/08   (2006.01)
  B32B 27/28   (2006.01)
  B32B 37/00   (2006.01)
  B32B 37/12   (2006.01)
  B32B 38/00   (2006.01)
  B32B 43/00   (2006.01)
  C09J 7/25    (2018.01)
  C09J 7/29    (2018.01)
  C09J 7/38    (2018.01)
(52) U.S. Cl.
  CPC .......... *B32B 27/08* (2013.01); *B32B 27/281* (2013.01); *B32B 27/283* (2013.01); *B32B 37/025* (2013.01); *B32B 37/12* (2013.01); *B32B 38/0004* (2013.01); *B32B 43/006* (2013.01); *C09J 7/25* (2018.01); *C09J 7/29* (2018.01); *C09J 7/38* (2018.01); *C09J 7/401* (2018.01); *B32B 2307/20* (2013.01); *B32B 2307/54* (2013.01); *B32B 2307/7376* (2023.05); *B32B 2307/748* (2013.01); *C09J 2301/124* (2020.08); *C09J 2301/162* (2020.08); *C09J 2301/18* (2020.08); *C09J 2301/302* (2020.08); *C09J 2479/086* (2013.01); *C09J 2483/005* (2013.01)

(56) References Cited

U.S. PATENT DOCUMENTS

| | | | | |
|---|---|---|---|---|
| 2009/0155984 | A1* | 6/2009 | Kim | H01L 21/561 |
| | | | | 257/E21.598 |
| 2014/0141683 | A1 | 5/2014 | Zhou | |
| 2020/0291274 | A1* | 9/2020 | Iwase | H05K 1/095 |
| 2021/0147717 | A1 | 5/2021 | Song et al. | |
| 2021/0246338 | A1 | 8/2021 | Takarada | |

FOREIGN PATENT DOCUMENTS

| | | | | | |
|---|---|---|---|---|---|
| JP | 2019137832 | A | * | 8/2019 | ............. C09J 11/06 |
| JP | 2020-122140 | A | | 8/2020 | |
| JP | 6833804 | B2 | * | 2/2021 | ............. B32B 27/00 |
| KR | 10-2015-0104473 | | * | 9/2015 | |
| KR | 10-2020-0012435 | A | | 2/2020 | |
| KR | 10-2084519 | B1 | | 3/2020 | |
| KR | 10-2020-0059959 | A | | 5/2020 | |
| WO | WO-2017149808 | A1 | * | 9/2017 | ............. B32B 27/00 |
| WO | WO-2020158484 | A1 | * | 8/2020 | ............. B32B 7/023 |
| WO | WO-2020241298 | A1 | * | 12/2020 | |

OTHER PUBLICATIONS

Machine Translation KR20150104473A (Year: 2015).*
Machine translation WO2017149808A1 (Year: 2017).*
Machine translation JP2019137832A (Year: 2019).*
Machine translation WO2020158484A1 (Year: 2020).*
Machine translation WO2020241298A1 (Year: 2020).*
Machine translation JP2020122140A (Year: 2020).*
Machine translation KR102084519B1 (Year: 2020).*
Machine translation KR20200012435A (Year: 2020).*
Machine translation JP6833804B2 (Year: 2021).*
International Search Report and Written Opinion issued for International Application No. PCT/KR2022/002495 on May 31, 2022, 5 pages.

* cited by examiner

[Figure 1]
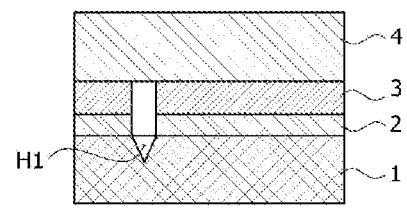
[Figure 2]
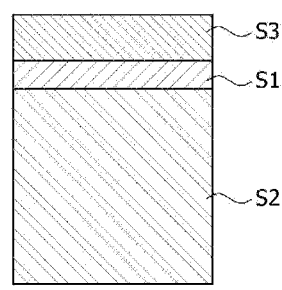

[Figure 3]
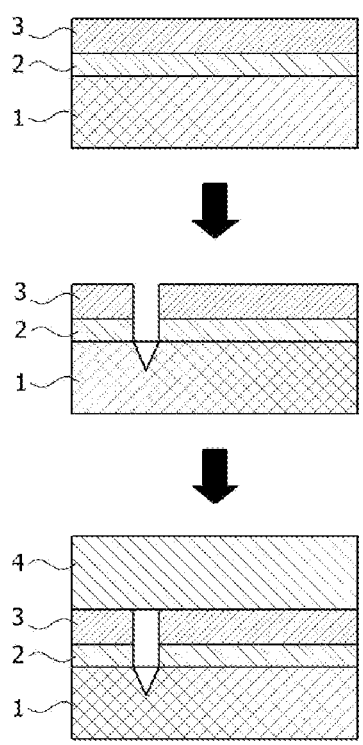

[Figure 4]
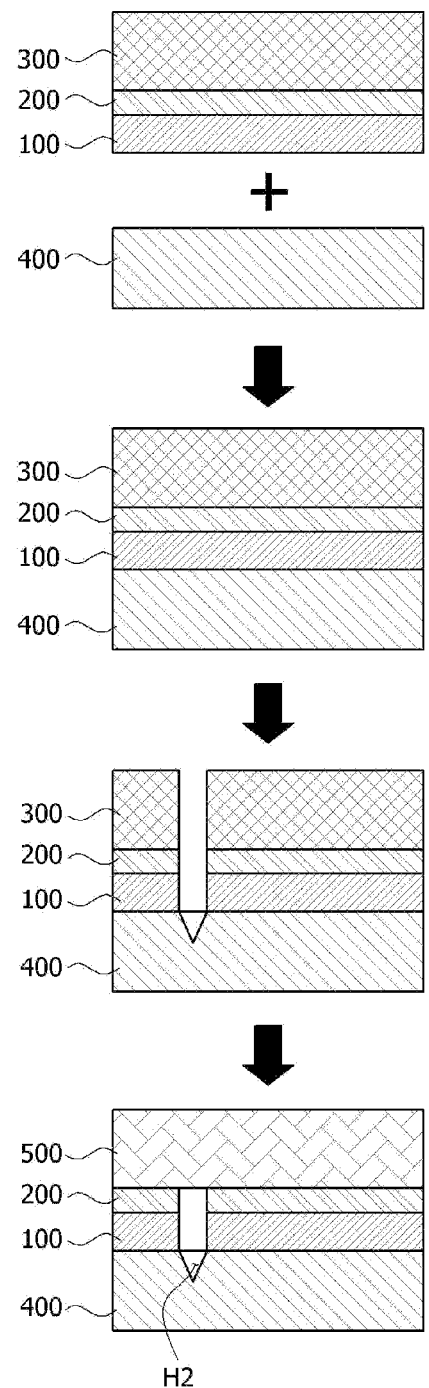

[Figure 5]
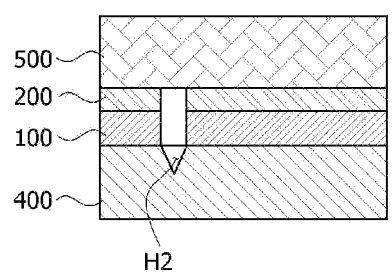

FOLDABLE BACKPLATE FILM MANUFACTURING METHOD

The present application relates to a method for manufacturing a foldable backplate film.

The application is a 35 U.S.C. 371 National Phase Entry Application from PCT/KR2022/002495 filed on Feb. 21, 2022, which claims the benefit of priority based on Korean Patent Application No. 10-2021-0025029 filed on Feb. 24, 2021 with the Korean Intellectual Property Office, all of the disclosures of which are incorporated herein by reference in their entirety.

BACKGROUND OF THE INVENTION

Technical Field

Recently, with the development of display-related technologies, display devices, which are deformable in the use stage, such as folding, rolling in a roll shape, or stretching like a rubber band, have been researched and developed.

The deformable display device may not only be transformed into a preset shape, but may also be transformed into various shapes in accordance with a user's request or in conformity with a situation in which the display device is used. Therefore, it is necessary to recognize the deformed shape of the display and control the display device in response to the recognized shape.

Meanwhile, the deformable display device has a problem in that each constitution of the display device is damaged according to the deformation, the respective constitutions of the display device must satisfy folding reliability and stability.

In particular, recently, flexible substrates are mainly used for thinning the display, where since the display panel using the flexible substrate is too thin, a foldable backplate film capable of supporting the display panel is attached to the lower part of the flexible substrate and used.

FIG. 1 is a vertical cross-sectional view showing an existing foldable backplate film; FIG. 2 is a plan view of the existing foldable backplate film; and FIG. 3 is a diagram exemplarily illustrating a method for manufacturing method an existing foldable backplate film.

The existing foldable backplate film has a structure of a release film (1)/a pressure-sensitive adhesive layer (2)/a foldable backplate (3)/a protective film (4), and in a process of manufacturing the foldable backplate film, a cutting process of cutting the foldable backplate film into a two-piece cell size along the cutting line (S2) is performed so that it consists of the body part (S1) attached to the screen part of the panel and the pad part (S3) attached to the lower part for DI bonding.

Referring to FIG. 1, the conventional cutting process was carried out by performing half-cutting in the direction from the foldable backplate (3) to the release film (1) and then attaching the protective film (4). As described above, in the conventional foldable backplate film manufactured by half-cutting, a groove (H1) is formed in the release film.

However, in the foldable backplate film manufactured through such a cutting process, there was a problem that the body part or the pad part of the foldable backplate film came with upon the release film peeling process.

BRIEF SUMMARY OF INVENTION

The present application relates to a method for manufacturing a foldable backplate film, which can prevent a problem that the backplate comes with upon the release film peeling process, by improving a half-cutting process.

According to one embodiment of the present application, a method for manufacturing a foldable backplate film comprising steps of: preparing a foldable backplate comprising a base film and a pressure-sensitive adhesive layer provided on one side of the base film; attaching a first release film to the opposite side of the side of the pressure-sensitive adhesive layer in contact with the base film; attaching a protective film to the opposite side of the side of the base film in contact with the pressure-sensitive adhesive layer; half-cutting the foldable backplate in a direction from the first release film to the protective film along a cutting line dividing a body part and a pad part; peeling the first release film after the half-cutting step; and attaching a non-cut second release film to the position where the first release film has been peeled off to manufacture a foldable backplate film is provided.

Advantageous Effects

In the method for manufacturing a foldable backplate film according to one embodiment of the present application, the foldable backplate film is manufactured by a method of cutting it in a direction from the release film to the protective film upon half-cutting, and then release-changing the release film, whereby it is possible to prevent the problem that the backplate comes with upon the release film peeling.

BRIEF DESCRIPTION OF DRAWINGS

FIG. 1 is a vertical cross-sectional view showing an existing foldable backplate film.

FIG. 2 is a plan view of the existing foldable backplate film.

FIG. 3 is a diagram exemplarily illustrating a method for manufacturing an existing foldable backplate film.

FIG. 4 is a diagram exemplarily explaining the method for manufacturing a foldable backplate film according to the present invention.

FIG. 5 is a diagram showing a foldable backplate film manufactured by the manufacturing method shown in FIG. 4.

DETAILED DESCRIPTION OF INVENTION

Hereinafter, this specification will be described in more detail.

In this specification, when any part "comprises" a certain component, it means that other components may be further included, rather than excluding other components, unless otherwise stated.

Examples of the present invention will be described in detail with reference to the accompanying drawings so that those having ordinary knowledge in the technical field to which the present invention pertains may easily practice it. However, the present invention may be embodied in several different forms, which is not limited to the examples described herein.

FIG. 4 is a diagram exemplarily explaining a method for manufacturing a foldable backplate film according to the present invention. FIG. 5 is a diagram showing a foldable backplate film manufactured by the manufacturing method shown in FIG. 4.

The method for manufacturing a foldable backplate film according to one embodiment of the present application comprises steps of: preparing a foldable backplate comprising a base film (100) and a pressure-sensitive adhesive layer (200) provided on one side of the base film (100); attaching a first release film (300) to the opposite side of the side of the pressure-sensitive adhesive layer (200) in contact with the base film (100); attaching a protective film (400) to the opposite side of the side of the base film (100) in contact with the pressure-sensitive adhesive layer (200); half-cutting the foldable backplate in a direction from the first release film (300) to the protective film (400) along a cutting line dividing a body part and a pattern part; peeling the first release film (300) after the half-cutting step; and attaching a non-cut second release film (500) to the position where the first release film (300) has been peeled off to manufacture a foldable backplate film.

The existing manufacturing method performs a process of half-cutting it in a direction from the backplate to the release film and then attaching a protective film thereto, whereas the manufacturing method according to the present invention performs half-cutting it in the direction from the release film to the protective film, followed by release-changing the cut first release film (100) to a non-cut release film (second release film), whereby it is possible to prevent a problem that the backplate comes with when the release film is peeled for product application. Due to the difference in these manufacturing methods, there is a difference that the foldable backplate film manufactured according to the existing manufacturing method has a groove (H1) formed on the release film (1) by half-cutting, whereas the foldable backplate film manufactured according to the manufacturing method of the present invention has a groove (H2) formed on the protective film (400) by half-cutting.

Then, the foldable backplate film according to the manufacturing method according to the present invention shows the following structural features during manufacturing processes.

In one example, in the half-cut state, the first release film (300), the base film (100) and the pressure-sensitive adhesive layer (200) may comprise a penetration region penetrated along the cutting line, and the protective film (400) may have a groove (H2) formed along the cutting line.

Also, the foldable backplate film that has undergone the cutting process has a structure in which a second release film (500), a pressure-sensitive adhesive layer (200), a base film (100) and a protective film (400) are sequentially laminated, wherein the second release film may not be formed with any penetration region and groove, and the pressure-sensitive adhesive layer and the base film may comprise penetration regions along a cutting line and the protective film (400) may comprise a groove along the cutting line.

That is, the foldable backplate film comprises a protective film (400) having a groove (H2), a base film (100) laminated to surround the groove (H2) and having a first penetration region in communication with the groove (H2), a pressure-sensitive adhesive layer (200) laminated on the base film and having a second penetration region in communication with the first penetration region, and a second release film (500) laminated on the pressure-sensitive adhesive layer (200). In addition, the second release film is not formed with any penetration region or groove in communication with the second penetration region.

In addition, as described below, the present application can provide a foldable backplate film having excellent reliability and stability through material selection and physical property control of each component.

The storage elastic modulus of the base film at 20° C. may be 1 GPa to 5 GPa, and for example, may be 1.5 GPa to 4 GPa or 2 GPa to 4 GPa. The base film according to the present application satisfies the range of the storage elastic modulus, whereby upon being applied to a backplate of a foldable display later, reliability is maintained even after repeated folding several times, the stress value generated upon folding is minimized and it has a feature that can satisfy hardness sufficient to be capable of supporting the display panel.

In one embodiment of the present application, a foldable backplate, in which the base film has an elongation at break of 20% or more and 200% or less at 20° C., is provided.

In another embodiment, the elongation at break of the base film at 20° C. may be 20% or more and 200% or less, preferably 40% or more and 180% or less, more preferably 70% or more and 150% or less.

When the initial length of the base film is L1 and the length that fracture occurs by stretching is L2, the elongation at break of the polyimide base material means (L2−L1)/L1*100(%).

The storage elastic modulus and the elongation at break were measured by the method of KS M ISO527 using Zwick's UTM. By cutting the film to be measured to a width of 5 mm and a length of 60 mm or more and then setting the gap between the grips to 40 mm, they can be each measured to a value measured while pulling the sample film at a speed of 20 mm/min.

In one embodiment of the present application, a foldable backplate film, in which the base film has a thermal contraction rate of 0.1% or less at 200° C., is provided.

In another embodiment, the thermal contraction rate of the base film at 200° C. may be 0.03% or more.

The thermal contraction rate means the degree of contraction in the direction having the maximum contraction force when heat is applied to the base film, and when the initial length of the base film is M1 and the length shrunk in the contraction direction after heating at 200° C. for 2 hours is M2, it means the value of (M1−M2)/M1*100.

As the base film has a thermal contraction force in the above range, it has a feature that deformation does not occur, because the contraction force is low even when heat is applied in the backplate coating process.

In one example, the base film may be a polyimide base film. For example, the base film may be a polyimide base film satisfying at least one or more of the storage elastic modulus, elongation at break and thermal contraction rate as described above.

In the case of the foldable backplate film according to the present application, the polyimide base film satisfying the above conditions is used, whereby it has excellent durability because plastic deformation does not occur in the backplate even when the folding and unfolding operations of the foldable display are repeated and it has a feature that the strain generated upon folding can be restored without permanent deformation upon defolding.

In addition, the thickness of the base film may be 20 μm or more and 120 μm or less, and for example, it may be 30 μm or more and 100 μm or less, or 40 μm or more and 80 μm or less. As the base film has the above thickness range, it has an excellent role as a support when used as a backplate of a foldable display later, a handling problem does not occur upon roll coating, and it has a feature that the stress value can be minimized because of a suitable curvature radius deviation.

The peel force of the first release film from the pressure-sensitive adhesive layer may be 12 gf/inch or less at 23° C., and for example, it may be 11 gf/inch or less, or 10 gf/inch or less. The peel force of the first release film from the pressure-sensitive adhesive layer has been measured at an angle of 180° and a peel rate of 2400 mm/min using a texture analyzer (Stable Micro Systems), which is values obtained by measuring the foldable backplate film manufactured by the present invention at 23° C., respectively.

The first release film and the second release film may be silicone series.

The first and second release films are layers for protecting the very thin first and second pressure-sensitive adhesive layers, which refer to transparent layers attached to one side of the first and second adhesive layers, where a film having excellent mechanical strength, thermal stability, moisture barrier properties, isotropy, and the like may be used. For example, acetate-based, polyester-based, polyethersulfone-based, polycarbonate-based, polyamide-based, polyimide-based, polyolefin-based, cycloolefin-based, polyurethane-based, silicone-based and acrylic resin films, such as triacetyl cellulose (TAC), and the like may be used, but it is not limited thereto as long as it is a commercially available silicone-based release film.

In one embodiment of the present application, the first release film and the second release film may further comprise an antistatic treatment to prevent damage to the display panel due to static electricity when they are attached to the lower part of the display panel.

In one embodiment of the present application, as the pressure-sensitive adhesive layer, one or more selected from the group consisting of an acrylic pressure-sensitive adhesive layer, a rubber-based pressure-sensitive adhesive layer and a silicone-based pressure-sensitive adhesive layer may be used.

In another embodiment, as the first pressure-sensitive adhesive layer, an acrylic pressure-sensitive adhesive layer may be used.

In one example, the surface resistance of the first release film and the second release film may be $10^{10}$ Ω/sq or less under a condition of 500V or less, and may be $3 \times 10^9$ Ω/sq or less, or $1 \times 10^9$ Ω/sq or less. The surface resistance of the first release film and the second release film can be measured using a concentric electrode on the PET back side of a test piece, and may be measured by the applied voltage of 500V, the applied time of 10 sec, 25° C. and 55RH % in MCT-HT800 (Mitsubishi Corporation).

The first release film and the second release film have a surface resistance value in the above range due to the antistatic treatment, and have a feature that damage to the display panel due to static electricity can be prevented when the first release film is peeled off later and then attached to the lower part of the display panel.

In one embodiment of the present application, the first release film and the second release film may further comprise an antistatic treatment to prevent damage to the display panel due to static electricity when they are attached to the lower part of the display panel.

The protective film may be attached by a process such as lamination, where the type of the protective film is not particularly limited, and a conventional product may be used. For example, as the protective film, products such as EPDC and LCFP composed of PET/PSA may be used.

In one embodiment, the protective film may have a groove formed along the cutting line. There is a difference in that as the manufacturing method according to the present application performs half-cutting in a direction from the first release film to the protective film, the groove is formed in the protective film, whereas because the existing cutting process performs half-cutting in a direction from the backplate to the release film, the groove is formed in the release film.

Hereinafter, examples of the present invention will be described in detail so that those having ordinary knowledge in the technical field to the present invention pertains can easily practice them. However, the present invention may be embodied in several different forms and is not limited to the examples described herein.

Example

According to the manufacturing method shown in FIG. 4, a foldable backplate film was manufactured.

Comparative Example

A foldable backplate film was manufactured according to the manufacturing method shown in FIG. 3.

Experimental Example

An evaluation experiment for improving reverse peeling of the foldable backplate films manufactured in Example and Comparative Example above was performed.

First, a double-sided tape was attached to an SUS plate, and the release film was attached on the double-sided tape so as to be a top surface. Then, a tape was attached to the lower right corner and peeled off.

When only the release film was peeled off, it was evaluated as good, and when the release film and the foldable backplate were peeled off together, it was evaluated as bad, and a total of 60 times were performed, and the results were shown in Table 1.

TABLE 1

|  | Good | Bad | Bad rate |
|---|---|---|---|
| Example | 60 | 0 | 0% |
| Comparative Example | 43 | 17 | 28% |

INDUSTRIAL APPLICABILITY

In the method for manufacturing a foldable backplate film according to an embodiment of the present application, the foldable backplate film is manufactured by a method of cutting it in a direction from the release film to the protective film upon half-cutting, and then release-changing the release film, whereby it is possible to prevent the problem that the backplate comes with the release film upon peeling of the release film.

The invention claimed is:

1. A method for manufacturing a foldable backplate film comprising steps of:
    preparing a foldable backplate comprising a base film and a pressure-sensitive adhesive layer provided on one side of the base film;
    attaching a first release film to the opposite side of the side of the first pressure-sensitive adhesive layer that is in contact with the base film;
    attaching a protective film to the opposite side of the side of the base film that is in contact with the pressure-sensitive adhesive layer;
    half-cutting the foldable backplate in a direction from the first release film to the protective film along a cutting line dividing a body part and a pad part;
    peeling the first release film from the pressure-sensitive adhesive layer after the half-cutting step; and attaching a non-cut second release film to the position where the first release film has been peeled off to manufacture the foldable backplate film.

2. The method for manufacturing a foldable backplate film according to claim 1, wherein in the half-cut foldable backplate,
   each of the first release film, the base film and the pressure-sensitive adhesive layer comprises a penetration regions penetrated along the cutting line, and
   the protective film has a groove formed along the cutting line.

3. The method for manufacturing a foldable backplate film according to claim 1, wherein the foldable backplate film has a structure in which the second release film, the pressure-sensitive adhesive layer, the base film and the protective film are sequentially laminated,
   each of the pressure-sensitive adhesive layer and the base film comprises a penetration region along the cutting line,
   the protective film comprises a groove along the cutting line, and
   the second release film does not comprise a penetration region or a groove formed.

4. The method for manufacturing a foldable backplate film according to claim 1, wherein the base film has an elongation at break of 20% or more and 200% or less at 20° C.

5. The method for manufacturing a foldable backplate film according to claim 1, wherein the base film has a thermal contraction rate of 0.1% or less at 200° C.

6. The method for manufacturing a foldable backplate film according to claim 1, wherein the base film is a polyimide base film.

7. The method for manufacturing a foldable backplate film according to claim 1, wherein the base film has a thickness of 20 µm or more and 120 µm or less.

8. The method for manufacturing a foldable backplate film according to claim 1, wherein the peel force of the first release film from the pressure-sensitive adhesive layer is 12 gf/inch or less at 23° C.

9. The method for manufacturing a foldable backplate film according to claim 1, wherein the first release film and the second release film are silicone series.

10. The method for manufacturing a foldable backplate film according to claim 1, wherein the first release film and the second release film have a surface resistance of $10^{10}$ Ω/sq or less under a condition of 500 V or less.

11. The method for manufacturing a foldable backplate film according to claim 1, wherein the protective film has a groove formed along the cutting line.

12. The method for manufacturing a foldable backplate film according to claim 3, wherein the penetration region of the base film is a first penetration region that is in communication with groove in the protective film and wherein the penetration region of the pressure-sensitive adhesive layer is a second penetration region that is in communication with the first penetration region.

13. The method for manufacturing a foldable backplate film according to claim 1, wherein the base film has a storage elastic modulus of 1 GPa to 5 GPa at 20° C.

* * * * *